A. S. HODGES.
APPARATUS FOR MOLDING SEAMLESS SASH WEIGHTS.
APPLICATION FILED AUG. 19, 1910.
987,299.
Patented Mar. 21, 1911.
5 SHEETS—SHEET 1.
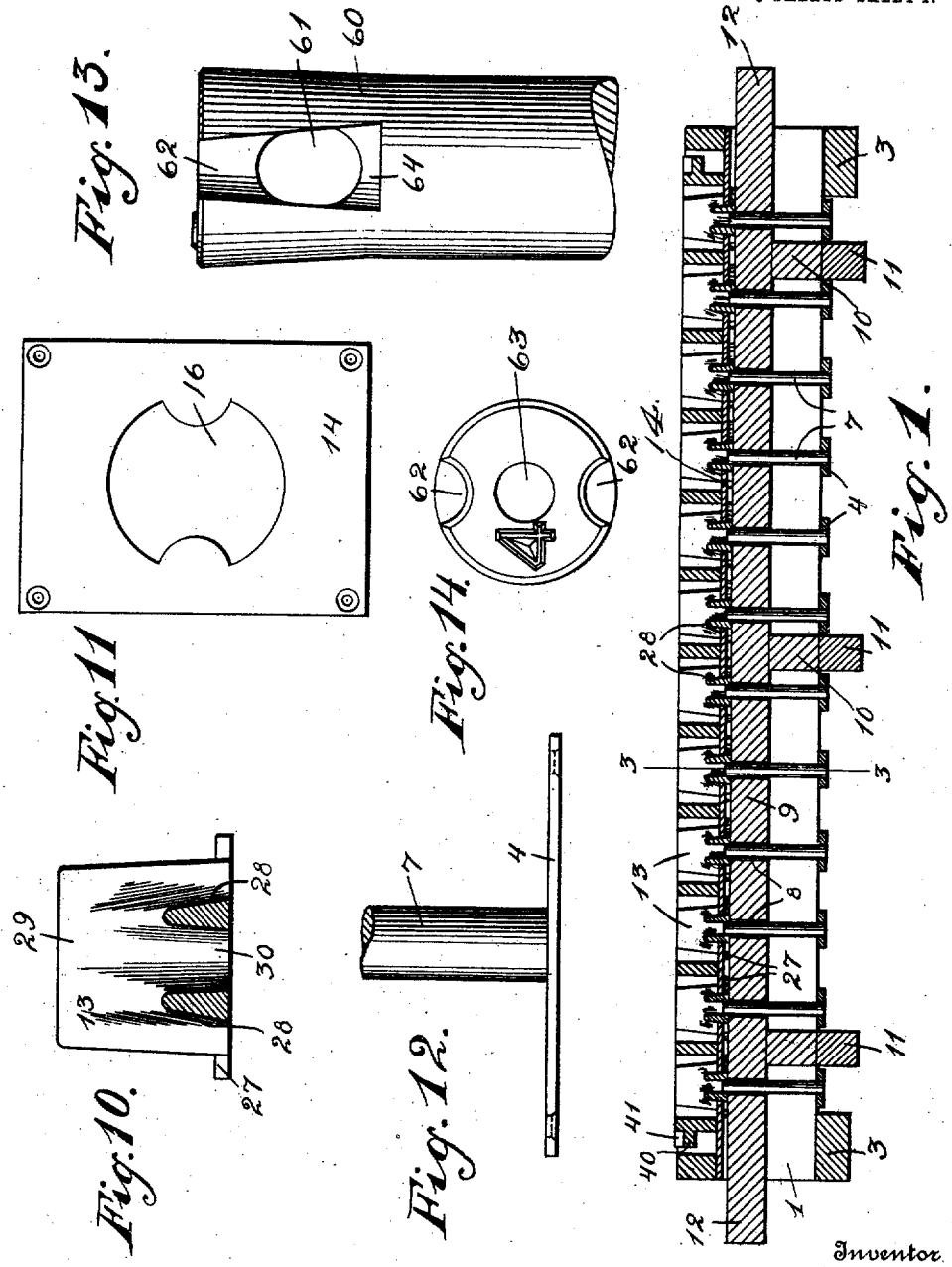
Witnesses
Inventor
Addison S. Hodges

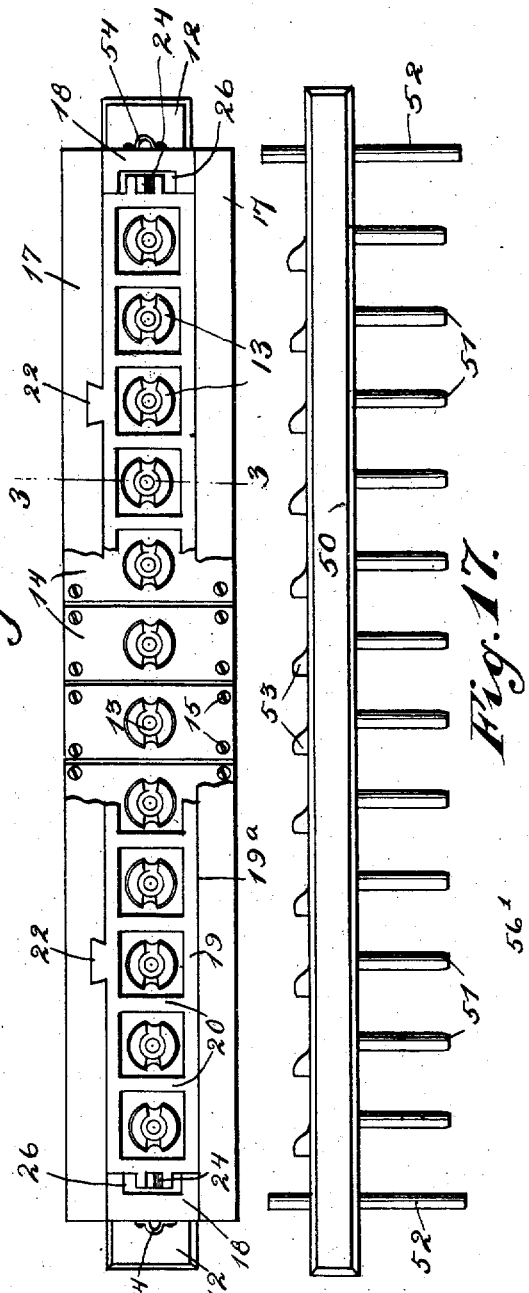

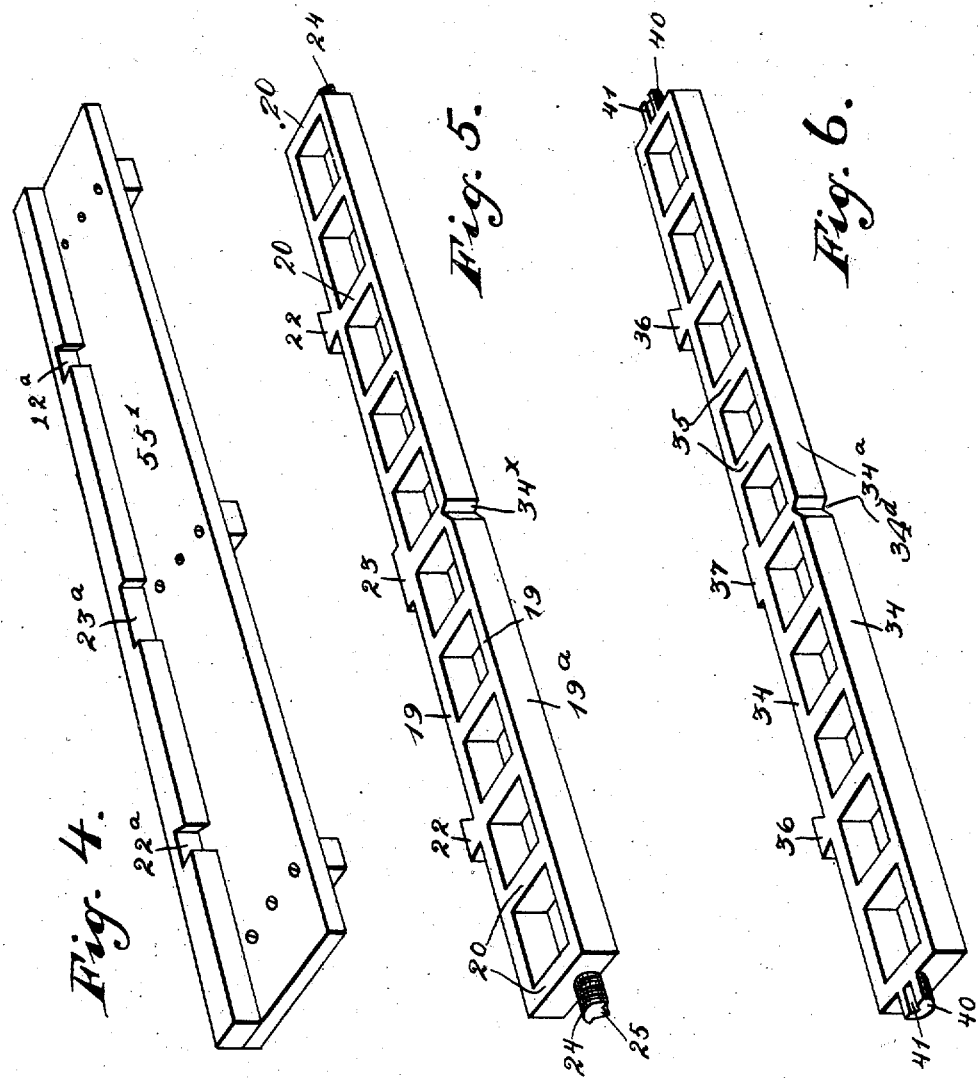

A. S. HODGES.
APPARATUS FOR MOLDING SEAMLESS SASH WEIGHTS.
APPLICATION FILED AUG. 19, 1910.
987,299.
Patented Mar. 21, 1911.
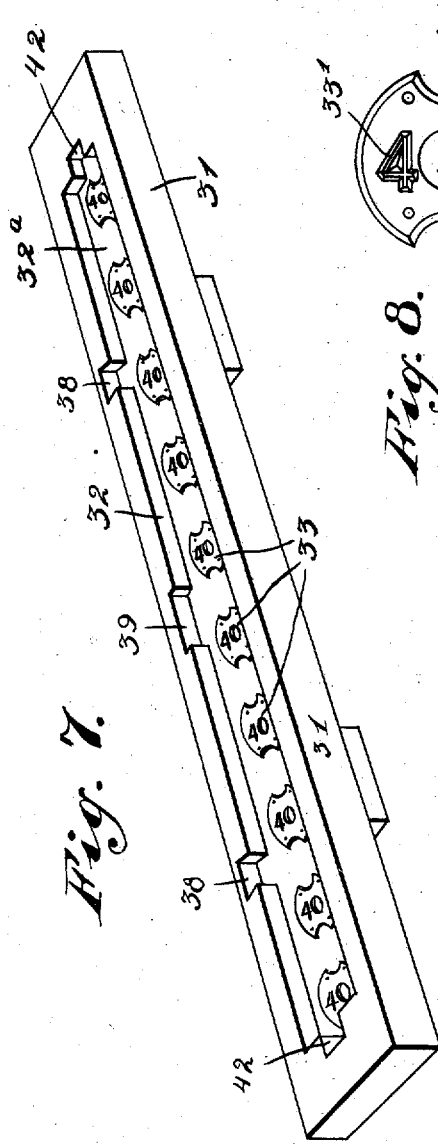
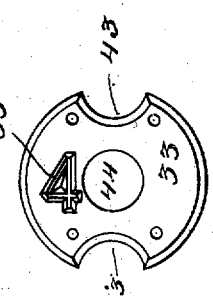
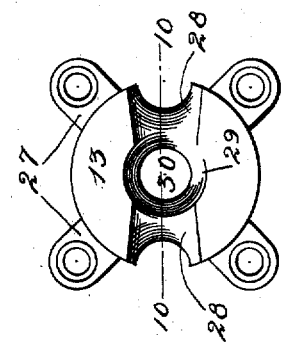
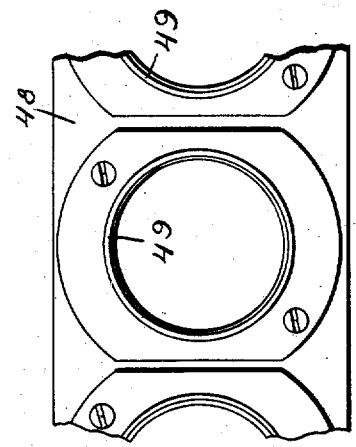
Inventor
Addison S. Hodges A. S. HODGES.
APPARATUS FOR MOLDING SEAMLESS SASH WEIGHTS.
APPLICATION FILED AUG. 19, 1910.
987,299.
Patented Mar. 21, 1911.
5 SHEETS—SHEET 5.
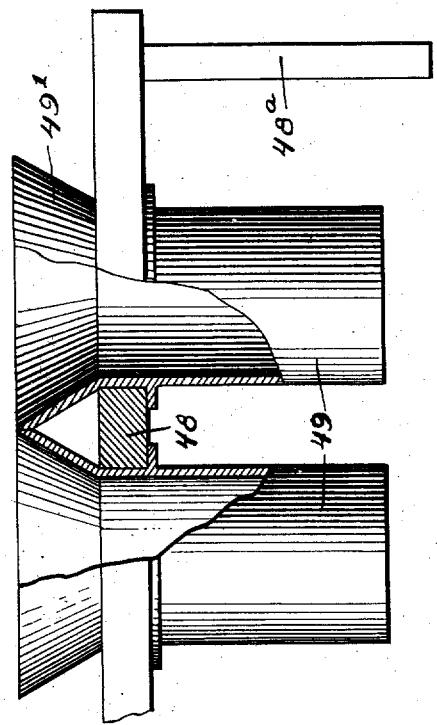
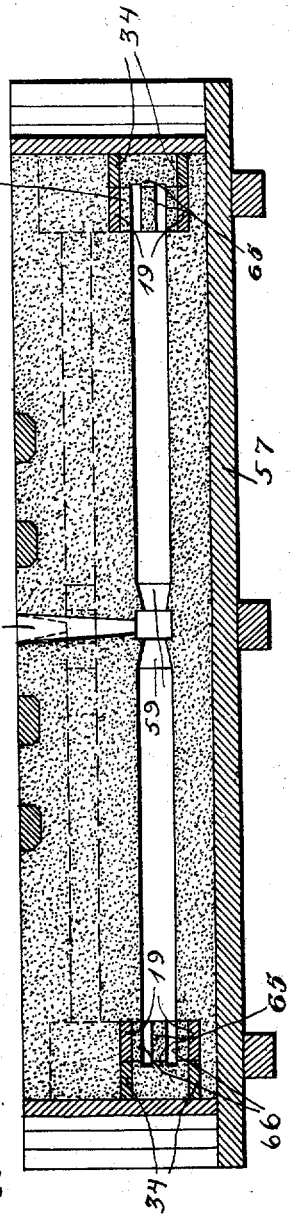
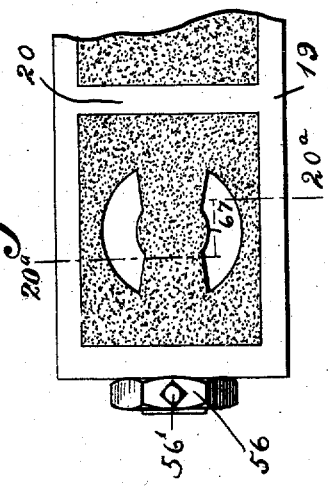
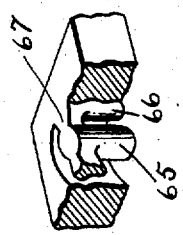
Witnesses
J. Milton Jester
B. W. Fishburne
Inventor
Addison S. Hodges
By
C. L. Parker
Attorney

UNITED STATES PATENT OFFICE.

ADDISON S. HODGES, OF SOMERVILLE, MASSACHUSETTS, ASSIGNOR TO SEAMLESS SASH WEIGHT COMPANY, OF SALEM, MASSACHUSETTS, A CORPORATION OF MAINE.

APPARATUS FOR MOLDING SEAMLESS SASH-WEIGHTS.

987,299. Specification of Letters Patent. Patented Mar. 21, 1911.

Original application filed November 20, 1909, Serial No. 529,074. Divided and this application filed August 19, 1910. Serial No. 577,931.

*To all whom it may concern:*

Be it known that I, ADDISON S. HODGES, a citizen of the United States, residing at Somerville, in the county of Middlesex and State of Massachusetts, have invented certain new and useful Improvements in Apparatus for Molding Seamless Sash-Weights, of which the following is a specification.

The subject matter of this application was shown and described but not claimed in my pending application, Serial Number 529,074, filed November 20, 1909, of which this application is a division.

My invention relates to apparatus for molding seamless sash weights and more particularly to an improvement on the apparatus shown and described in Letters Patent No. 666,671, granted to me January 29, 1901.

An important object of my invention is to provide a device which will simplify and expedite the manufacture of seamless sash weights.

A further object of my invention is to provide a device, so constructed that it will be unnecessary to rap the head-core frame when removing the head-patterns.

My invention consists in the combination and arrangement of parts, hereinafter to be described, and more particularly pointed out in the claims.

In the accompanying drawings, forming a part of this specification, and in which like numeral references are used to designate like parts throughout the same, Figure 1 is a vertical longitudinal sectional view of the device carrying the head-patterns. Fig. 2 is a plan view of the same, parts thereof being broken away. Fig. 3 is a vertical cross-sectional view, taken on the line 3—3 of Fig. 2. Fig. 3ª is a view similar to Fig. 3, but showing the parts inverted and the patterns withdrawn from the core-frame. Fig. 4 is a perspective view of the platen for use in connection with the device illustrated in Fig. 1. Fig. 5 is a similar view of the head-core frame. Fig. 6 is a similar view of the figure-core frame. Fig. 7 is a similar view of the figure-pattern frame. Fig. 8 is a top plan view of one of the figure-patterns removed. Fig. 9 is a similar view of one of the head-patterns removed. Fig. 10 is a vertical sectional view on line 10—10 of Fig. 9. Fig. 11 is a top plan view of one of the stripping plates. Fig. 12 is an enlarged fragmentary side view of one of the guide pins employed upon the device shown in Fig. 1. Fig. 13 is a side view of the head end of the sash weight. Fig. 14 is an end view of the same. Fig. 15 is an end view of the head-core frame and figure-core frame, the same being arranged in engagement with each other. Fig. 16 is a fragmentary top plan view of a ramming device. Fig. 17 is a side view of a ramming device, carrying patterns. Fig. 18 is a side view of the device shown in Fig. 16, portions thereof being broken away. Fig. 19 is an enlarged plan view of one of the impression patterns. Fig. 20 is a fragmentary plan view of the head-core frame, the same being filled with sand. Fig. 20ª is a perspective view of one of the head-cores removed, the same being shown partly in section, such section being taken on the line 20ª—20ª of Fig. 20. Fig. 21 is a vertical longitudinal sectional view of the flask.

In the drawing wherein I have illustrated a preferred embodiment of my invention, 1 and 2 designate spaced longitudinal sides, which are connected at their ends by means of transverse strips 3, secured upon the lower edges thereof. The sides 1 and 2 are further provided upon their lower edges with spaced transverse plates 4, secured thereto, as shown at 5 and 6 respectively. Each of the spaced transverse plates 4 is provided centrally thereof with a vertical guide pin 7, which extends through an opening 8, upon a head-pattern support 9, which is provided at spaced intervals with depending members 10, arranged between the transverse plates 4. Each of the depending members 10 is provided upon the lower end thereof with a transverse strip 11, which is adapted to engage the sides 1 and 2 between the transverse plates 4.

The head-pattern support 9 is arranged between the sides 1 and 2 and is adapted for relative vertical movement with reference thereto, the pins 7 and members 10, serving as a guide for same in such movement. The head-pattern support 9 is limited in its relative movement by means of the transverse strips 11, secured upon the members 10. The head-pattern support 9 extends longitudinally beyond the sides 1 and 2, as shown at 12, for a purpose to be hereinafter set forth. The head-pattern support 9 is further provided upon its upper side with spaced head-patterns 13, which are centrally disposed upon said support 9, and in longitudinal alinement with each other.

By reference to Fig. 1, it will be seen that each successive head-pattern 13 is arranged above and in alinement with a corresponding successive pin 7, and each of the head-patterns 13 has its center in vertical alinement with the central longitudinal axis of its corresponding pin 7. The specific structure of the head-patterns 13 will be hereinafter described.

The sides 1 and 2 are provided upon their upper edges with stripping plates 14, secured thereto by means of screws 15 or the like. The stripping-plates 14 are arranged to laterally engage each other and are provided centrally thereof with openings 16, through which the head-patterns 13 extend. Rigidly secured upon the upper side of the stripping-plates 14, are spaced longitudinal side strips 17, which are connected at their ends by transverse strips 18, thus forming a rectangular recess above the stripping-plates 14, adapted for the reception of a head core-frame 19ª, to be hereinafter described. The head-core frame 19ª is rectangular in shape and comprises longitudinal sides 19, connected at their ends and at spaced intervals by transverse strips 20, to form a plurality of square compartments, within which extend the head-patterns 13.

By reference to Fig. 1, it will be seen that the upper ends of the head-patterns 13 are flush with the longitudinal sides 19 and transverse strips 20, of the head-core frame. One of the longitudinal sides 19 of the head-core frame is provided near its ends with laterally extending dove-tailed projections 22, and near its center with lateral projections 23, which are adapted to fit within corresponding openings upon one of the strips 17, arranged above the stripping plates 14. The opposite side has a V-shaped groove 34ˣ which serves as a guide in adjusting the head molds in position adjacent the body molds hereinafter referred to. The transverse end strips 20 are provided with outwardly extending screw-threaded trunnions 24 which are substantially semi-cylindrical and are provided upon their straight sides with the tapering portions 25 for a purpose to be explained. The screw-threaded semi-cylindrical trunnions 24 are adapted to be arranged within recesses 26, formed upon the transverse strips 18. It is to be understood that the head-core frame is readily removable from its position upon the stripping plates 14 between the strips 17. The head-patterns 13 above referred to are alike and I will describe only one of them. Each of the head-patterns 13 is provided at its lower end with apertured ears 27, by means of which the head-pattern is secured to the support 9. The head-pattern 13 is of the form shown in Figs. 9 and 10 and comprises a body of cylindrical shape. The body of the head-patterns 13 is provided with diametrically arranged longitudinal semi-cylindrical recesses 28, which merge into and are connected by a transverse recess 29, which extends through the upper end of the head-pattern. The head-pattern is further provided with an axial cylindrical opening 30, which merges into said transverse opening 29.

As shown in Fig. 7, I provide a figure-pattern support 31, which is rectangular and provided with a rectangular recess 32, within which is disposed preferably removable bottom plate 32ª carrying spaced figure-patterns 33, to be hereinafter described. The support 31 may be advantageously provided with several bottom plates 32ª for different figure patterns. The rectangular recess 32 is adapted to receive a figure-core frame 34ª as shown in Fig. 6, and which comprises spaced longitudinal sides 34, connected at their end and at spaced intervals by transverse strips 35, for forming a plurality of square compartments. One of the longitudinal sides 34, of the figure-core frame is provided with dove-tailed projections 36, and a centrally arranged projection 37, which are adapted to fit within corresponding openings 38 and 39, respectively, upon the support 31. The opposite side has a V-shaped groove 34ᵈ corresponding to the similarly disposed groove 34ˣ in the frame 19ª. The figure-core frame 34ª, shown in Fig. 6, is provided at the ends thereof with semi-cylindrical screw-threaded trunnions 40, which are provided with recesses 41, upon their upper surfaces, and which are adapted to fit within recesses 42 near the ends of the support 31. Each successive figure-pattern 33 is adapted to be arranged centrally within each successive square compartment of the figure-core frame 34ª, and it is to be understood that the figure-core frame is readily removable from the support 31. Each of the figure-patterns 33, as shown in Fig. 8, is circular, and is provided with diametrically arranged recesses 43, and a central recess 44, near which is arranged the raised figure 31'. The recesses 43 and the central recess 44 are adapted to register with the recess 28 and the central opening 30 of the head-pattern, shown in Fig. 9, as will be apparent hereinafter.

In the use of my device hereinabove described, the head-core frame 19ª is arranged upon the stripping plates 14, between the side strips 17, (see Fig. 2) and the molding sand is then put into the compartments formed by the sides 19 and strips 20, and which compartments contain the head-patterns 13. The molding sand is rammed into the compartments of the head-core frame preferably by means of the ramming device shown in Figs. 16 and 18, which comprise a body support 48, provided with a plurality of spaced circular openings below which end registering with the same are secured opened ended cylinders 49, which are extended on the upper side of the support 48 in the form of flaring hoppers 49'. A guide pin 48ª is provided for engagement within brackets 54, which are arranged upon the transverse end strips 18.

It is to be understood that the cylinders 49 are adapted to surround the head-patterns 13, and that sand may be poured through the cylinders 49, during the ramming process, although the sand may be placed in the compartments before the ramming operation, if desired.

As illustrated in Fig. 17, I provide a second ramming device comprising a longitudinal body 50, provided at spaced intervals with the ramming pins 51, which are adapted to ram the sand within the openings 30, of patterns 13. The longitudinal body 50 is provided near the ends thereof with guide pins 52, which extend downwardly below the same for engagement within the brackets 54. The guide pins 52, extend upwardly beyond the longitudinal body portion 50 and are in alinement with a plurality of patterns 53, arranged at intervals upon the body portion 50.

After the removal of the ramming devices and the leveling off of sand, the longitudinal body 50 of the second ramming device is inverted and the upper ends of the guide pins 52 are inserted within guide brackets 54, which are secured to the transverse end strips 18. The patterns 53 are spaced from each other as above stated and are arranged to be directed by the guide pins 52 and the brackets 54, to ends of the transverse openings 28 of the head-patterns 13. The patterns 53 are alike and are of the form shown in Fig. 19. Each of the patterns 53, has a curved engaging surface as at 55, which is adapted to form a corresponding recess in the sand.

It is to be understood that the size and shape of the patterns 53 may be widely varied to increase or diminish the size of a web or bridge 64 (Fig. 13) which has for its purpose to strengthen the heads of the sash weights, it being understood, however, that the opening 61 adjacent such lock or bridge is to be sufficient for the reception of a suitable sash cord.

The patterns 53 are removed and a mold board or platen 55' illustrated in Fig. 4 is placed upon the head-core frame 19ª. The entire device is then inverted, which may be conveniently accomplished by grasping the ends 12 of the head-pattern support 9, and the ends of the platen 55'. The operator then raises the ends 12 of the support 9, which will cause the head-patterns 13 to be withdrawn from the sand within the head-core frame 19ª. The guide pins 7, and the stripping plates 14 remain stationary until the head-pattern support 9 is raised to engage the transverse base strips 3, when the entire device may be raised and the head-core frame 19ª will be left upon the platen.

The figure-core 34ª shown in Fig. 6, is placed within the recess 32 upon the figure-pattern support 31 illustrated in Fig. 7. The molding sand is then put into the figure-core frame 34ª and rammed by any suitable means. A mold board or platen similar to the platen shown in Fig. 4, is then placed upon the figure-core frame with projections 36 and 37 within recesses 22ª and 23ª, and the whole is inverted. The figure-pattern support 31 is then raised and the figure-core frame 34ª will remain upon the platen. The figure-core frame 34ª is then placed upon the head-core frame 19ª, and a ring 56 is then placed upon the threaded trunnions 24 and 40, the ring 56 being provided with a set screw 56' for clamping the trunnions rigidly together. By reference to Fig. 15 it will be obvious that the portion 25 fits within the recess 41, which tends to prevent relative movement of the trunnions.

By reference to Fig. 21 it will be seen that I employ a flask 57, which is non-divided and similar in construction to that shown and described in my Patent, No. 666,671, the same having a central sprue hole 58, leading to the inner ends of the core-openings 59, or molds which are formed by the withdrawal of body patterns, and lead to the head-core frame and figure-core frame, as shown by the numerals 19 and 34 in Fig. 21.

While I have shown my core frames in connection with the body flasks, shown and described in my Patent No. 666,671, it is to be understood that they may be used in connection with any open ended body flasks and body flask shown in my said Patent No. 666,671.

I have illustrated in Fig. 13, the upper end 60 of one of the seamless sash weights made by my improved apparatus. The end 60 is provided with a transverse opening 61, which communicates with longitudinal diametrically arranged recesses 62, extending inwardly from the end. The head 60 is further molded with an axial opening 63, which extends between the recesses 62 and communicates with the transverse opening 61. One of the recesses 61 is provided adjacent the body of the weight with a curved web or bridge 64, which partly closes the said recess 62 and strengthens the engagement of the head with the body of the weight.

In Fig. 21 is shown a cross-sectional view of the figure-core frame and the head-core frame, in engagement with each other and filled with molding sand and having the patterns removed. In this view is shown central sections of sand 65 which form the axial opening 63 in the head of the weight. The diametrically arranged sections of sand 66 form the recesses 62, and a transverse section of sand 67 forms the transverse opening 61. The portion 64, above referred to is formed by the impression made by the pattern 53.

It will be noted by reference to Fig. 21 that the central sections of sand 65 of the head-core and of the figure-core abut in a separate plane from that of the abutting edges of the frames 19ª, and 34ª. This is due to the fact that the ends of the pins 7 terminate in a plane substantially lower than the upper surface of the stripping plates 14.

In the use of my apparatus the cores are formed in the head-core frame and figure-core frame as above described. The head-core frame and figure-core frame designated by the numerals 19 and 34 in Fig. 21, are secured together as above described and arranged transversely at one end of the flask 57, so that the core-opening 59 for forming the body of the sash weight will register with one of the compartments of the head-core frame. The molten metal is then poured into the sprue hole 58, and will accordingly flow through the opening 59 into the core frames designated at 19 and 34. After the molten metal is cooled, and hardened, the sand in the flask 57, is broken up and the sash weights removed.

Having fully described my invention, I claim:—

1. In an apparatus of the character described, the combination with a flask provided with means for forming the body of a sash-weight, of means for forming a head for said sash-weight, comprising core-frames, and means for securing the same together.

2. In an apparatus of the character described, the combination with a head-forming mold casing comprising co-acting sections, of a body-forming mold casing having means for receiving and holding the sections in associated condition and with the head mold therein in proper register with the body mold.

3. In an apparatus of the character described, the combination with a head-forming mold casing comprising co-acting sections, of means for securing the sections together with the molds therein in properly associated conditions, and a body-forming mold casing having means for receiving the sectional mold casing and holding the mold thereof in proper register with the body mold.

4. In an apparatus of the character described, the combination with a head-forming mold casing comprising co-acting section boxes, each having partitions therein forming a plurality of compartments for containing the mold head, of means for securing the sections together with the corresponding compartments alined, and a casing for holding a plurality of body molds, said casing receiving the sectional head casing to permit the head molds thereof to be alined with the body molds.

5. In apparatus of the character described, the combination with a flask provided with means for forming the body of a sash weight, of means for forming the head of said sash weight, comprising a head-core frame and figure-core frame.

6. In apparatus of the character described, the combination with a flask provided with means for forming the body of a sash weight, of means for forming the head of said sash weight, comprising detachable head-core and figure-core frames, and means for detachably connecting the same together.

In testimony whereof I affix my signature in presence of two witnesses.

ADDISON S. HODGES.

Witnesses:
RALPH B. McDANIEL,
STEPHEN A. POPE.

---

Copies of this patent may be obtained for five cents each, by addressing the "Commissioner of Patents, Washington, D. C."